US011697099B2

(12) United States Patent
Carr et al.

(10) Patent No.: US 11,697,099 B2
(45) Date of Patent: Jul. 11, 2023

(54) DIRECT ELECTRICAL HEATING OF CATALYTIC REACTIVE SYSTEM

(71) Applicants: Schneider Electric Systems USA, Inc., Foxborough, MA (US); Eurotherm Automation SAS, Dardilly (FR)

(72) Inventors: Lanyon Carr, Gold River, CA (US); Gregoire Quere, Lyons (FR)

(73) Assignee: SCHNEIDER ELECTRIC SYSTEMS USA, INC., Foxborough, MA (US)

( * ) Notice: Subject to any disclaimer, the term of this patent is extended or adjusted under 35 U.S.C. 154(b) by 0 days.

(21) Appl. No.: 17/532,571

(22) Filed: Nov. 22, 2021

(65) Prior Publication Data

US 2023/0158464 A1 May 25, 2023

(51) Int. Cl.
  *B01J 8/06* (2006.01)
  *B01J 19/24* (2006.01)
  *B01J 21/04* (2006.01)
  *B01J 19/00* (2006.01)
  *B01J 23/755* (2006.01)

(52) U.S. Cl.
  CPC .......... *B01J 8/067* (2013.01); *B01J 19/0013* (2013.01); *B01J 19/2415* (2013.01); *B01J 21/04* (2013.01); *B01J 23/755* (2013.01); *B01J 2208/00389* (2013.01); *B01J 2208/00407* (2013.01); *B01J 2208/00415* (2013.01); *B01J 2219/00132* (2013.01)

(58) Field of Classification Search
  CPC .... B01J 8/06; B01J 8/067; B01J 2208/00389; B01J 2208/00407; B01J 2208/00415; B01J 19/2415; B01J 19/0013; B01J 19/2425; B01J 2219/00132; B01J 2219/00135
  See application file for complete search history.

(56) References Cited

U.S. PATENT DOCUMENTS 1,985,680 A * 12/1934 Mapes ............... C10G 9/42
                                                  196/121
3,147,080 A *  9/1964 Jahnig .............. C01B 3/38
                                                  423/654

(Continued)

FOREIGN PATENT DOCUMENTS

CN       201135883 Y      10/2008
DE       10144891    *    3/2003
(Continued)

OTHER PUBLICATIONS

Machine Translation of DE 101 44 891 A1 (Year: 2003).*
(Continued)

*Primary Examiner* — Lessanework Seifu
(74) *Attorney, Agent, or Firm* — Stinson LLP (57) ABSTRACT

Methods of heating a reactor system by providing electrical energy are described. A reactor system comprising at least one reactor tube having a catalyst disposed therein and comprises at least one electrically conductive surface is heated by providing electrical energy to the at least one electrically conductive surface on the reactor tube and adjusting a current level of the electrical energy provided to the at least one electrically conductive surface to control the temperature of the reactor tube and the catalyst disposed therein. The reactor tube may be electrically isolated from other electrically conductive components of the reactor system.

26 Claims, 8 Drawing Sheets

(56) References Cited

U.S. PATENT DOCUMENTS

| | | | | |
|---|---|---|---|---|
| 4,285,837 | A | * | 8/1981 | Sato .................. C01B 3/40 |
| | | | | 423/654 |
| 4,400,784 | A | * | 8/1983 | Funk .................. C10G 9/206 |
| | | | | 422/62 |
| 5,264,183 | A | | 11/1993 | Ebner et al. |
| 5,294,411 | A | | 3/1994 | Breuer et al. |
| 5,694,770 | A | | 12/1997 | Brück et al. |
| 5,759,499 | A | * | 6/1998 | Bourdet .............. C01B 3/386 |
| | | | | 219/67 |
| 9,908,091 | B2 | * | 3/2018 | Vogel ................. C01B 3/384 |
| 10,774,969 | B2 | | 9/2020 | Eder |
| 2013/0108517 | A1 | * | 5/2013 | Tosti ................ B01D 71/022 |
| | | | | 422/187 |
| 2016/0115025 | A1 | | 4/2016 | Seiwert et al. |
| 2017/0183228 | A1 | | 6/2017 | Lin et al. |
| 2018/0048007 | A1 | | 2/2018 | Jamal et al. |
| 2021/0113983 | A1 | | 4/2021 | Mortensen et al. |
| 2021/0179948 | A1 | | 6/2021 | Kochendoerfer et al. |

FOREIGN PATENT DOCUMENTS

| | | |
|---|---|---|
| EP | 3950113 A1 | 2/2022 |
| WO | 2004091773 A | 10/2004 |
| WO | 2020/002326 A1 | 1/2020 |
| WO | 2021160777 A1 | 8/2021 |

OTHER PUBLICATIONS

Gerard B. Hawkins, Managing Director, "Steam Reforming Common Problems," wwww.GBHEnterprises.com, Sep. 24, 2013, pp. 1-61.

Steam Methane Reforming, "Reformer Performance and Tube Life Management", Nitrogen+Syngas 339, (2016), www.nitrogenandsyngas com., pp. 38-56.

GBH Enterprises Ltd., "C2PT Catalyst, Process Technology Consultancy, Understanding Catalyst Breakage in Reformer Tubes," www.GBHEnterprises.com, Jun. 2, 2018, pp. 1-28.

* cited by examiner

DIRECT ELECTRICAL HEATING OF CATALYTIC REACTIVE SYSTEM

FIELD

Provided herein are methods and systems for direct electrical heating of catalytic reactive systems. Also provided herein are methods for conducting catalytic reactions comprising a system utilizing direct electrical heating.

BACKGROUND

Typically, a reaction system for a catalytic reaction comprises arranging a catalyst within a reactor and directing a fluid (i.e. a liquid or gas) through the reactor where the catalytic reaction takes place. The product of the catalytic reaction is then withdrawn from the reactor and collected as a final product or directed for further processing.

Certain catalytic reactions require the presence of external heat to promote the reaction and or efficiently produce the desired product. Many systems of heating a catalytic reactor are known. For example, fired heating. Fired heating typically is comprised of either a direct fired heating system or an indirect fired heating system. In either fired heating system, the heat is typically generated by combustion of a hydrocarbon.

However, a problem exists when the heat supplied to a reactor system is provided by a fired heating system. For example, in a catalytic reaction system comprising reactor tubes, the fired heating of the reactor tube often results in uneven temperature gradients along the tube. Uneven temperature gradients along the tube can lead to premature tube failure and adversely impact throughput, catalyst life, and yield/quality of the desired product. Additionally, where multiple reactor tubes are present, there is typically a temperature differences between the tubes. Temperature differences between the reaction tubes in the same reactor system results in non-optimal throughput, and yield/quality of the desired product.

Furthermore, all fired heaters are subject to typical wear and tear which will ultimately lead to deterioration in the fired heater energy efficiency. Where the fired heater comprises combustion of hydrocarbons or other materials that emit greenhouse gases such as $CO_2$, this deterioration in fired heater energy efficiency contributes to increases in greenhouse gases released from the fired heater.

Accordingly, there remains a need in the art to develop reaction systems and processes wherein heat is provided to the catalytic reaction such that a more even temperature gradient is observed along the surface of the reactor. There also remains a need in the art for the development of heating methods for catalytic reaction processes where the emission of greenhouse gases or other pollutants are minimized or eliminated.

SUMMARY

The present disclosure is directed to a method of heating a reactor system wherein the reactor system comprises at least one reactor tube having a catalyst disposed therein and wherein the reactor tube comprises at least one electrically conductive surface. The method comprises electrically isolating the reactor tube from other electrically conductive components of the reactor system; providing electrical energy to the at least one electrically conductive surface on the reactor tube; and adjusting a current level of the electrical energy provided to the at least one electrically conductive surface to control the temperature of the reactor tube and the catalyst disposed therein.

The present disclosure is also directed to a method of heating a reactor system comprising a plurality of reactor tubes having a catalyst disposed therein and wherein each of the plurality of reactor tubes comprise at least one electrically conductive surface. The method comprises electrically isolating each of the plurality of reactor tubes from the other electrically conductive components of the reactor system; providing electrical energy to the at least one electrically conductive surface on each of the plurality of reactor tubes; and controlling the temperature of each of the plurality of reactor tubes and the catalyst disposed therein by adjusting a current level of the electrical energy provided to the at least one electrically conductive surface.

A reactor system embodying aspects of the present disclosure comprises one or more reactor tubes each having a catalyst disposed therein as well as inflow and outflow pipes through which fluid enters and exits the reactor tube, respectively. The system also includes insulative gaskets between the reactor tube and inflow and outflow pipes to electrically isolate the reactor tube from other electrically conductive components of the reactor system. An electrical power source is configured to energize at least one electrically conductive surface on the reactor tube with an adjustable current level of electrical energy to control the temperature of the reactor tube and the catalyst disposed therein.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

The present disclosure is directed to a method of heating a reactor system comprising a reactor having a catalyst disposed therein, wherein the reactor and the catalyst are heated by providing electrical energy to at least one electrically conductive surface on the reactor.

Figure 1:
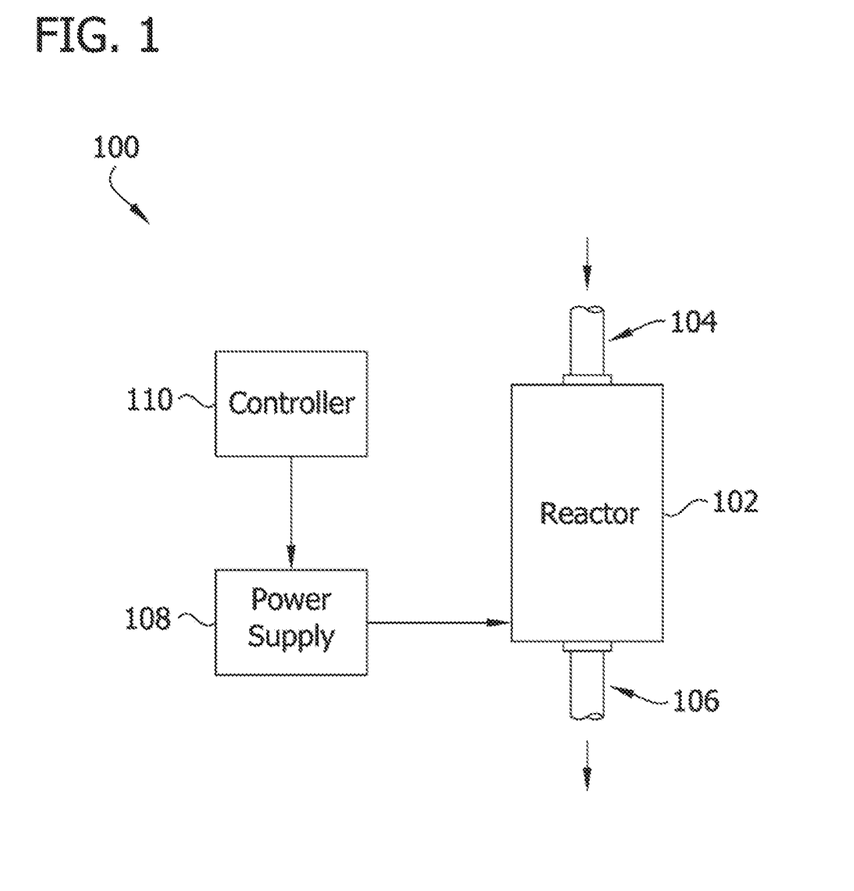
FIG. 1 is a block diagram of a reactor system according to an embodiment.

Referring to FIG. 1, a reactor system 100 embodying aspects of the present disclosure includes a reactor 102 having one or more reactor tubes (not shown) through which material flows into the reactor at an inlet 104 and flows out of the reactor at an outlet 106. In the illustrated embodiment, an electrical power supply 108 is configured to energize a conductive surface (not shown) of each reactor tube. During operation, a controller 110 adjusts a current level of electrical energy supplied to the conductive surface by the power supply 108.

Figure 2:
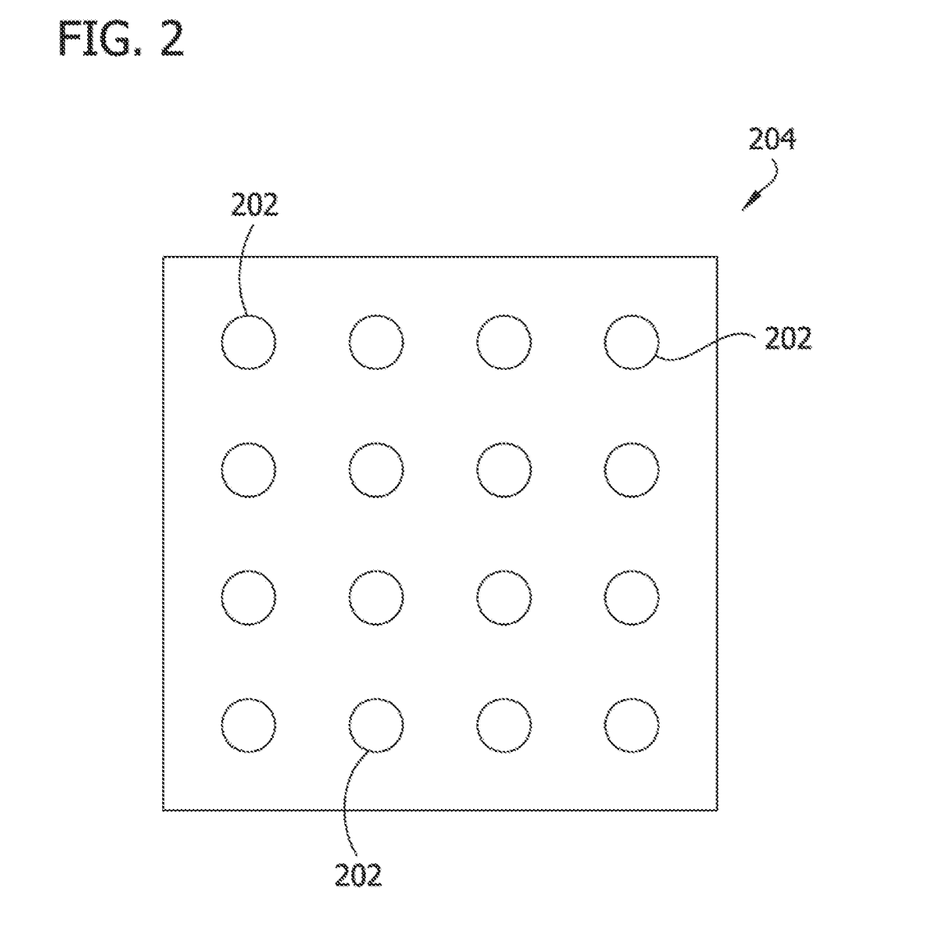
FIG. 2 provides a top-down view of the reactor system of FIG. 1 comprising a plurality of reactor tubes having a catalyst disposed therein.

FIG. 2 shows a top-down view of the reactor 102 comprising a plurality of reactor tubes 202, each having a catalyst (not shown) disposed therein. The circles represent individual reactor tubes 202 contained within a thermally insulated housing 204. In addition, each of the individual reactor tubes 202 are electrically isolated from other electrically conductive elements in reactor 102 and from each other.

Figure 3:
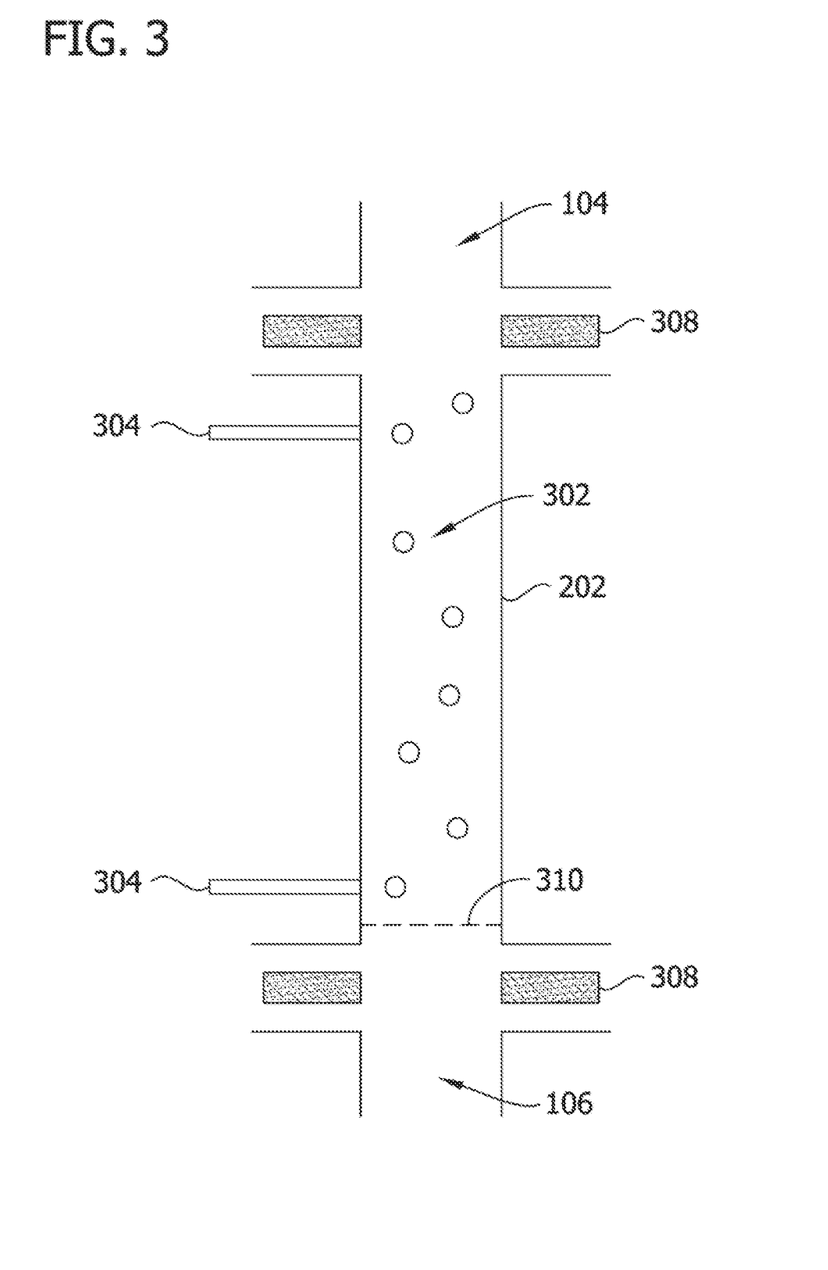
FIG. 3 provides a side view representation of an individual reactor tube of the plurality of reactor tubes present in the reactor system of FIG. 2.

FIG. 3 shows a side view of one reactor tube 202 as described above. The material to be contacted with a catalyst 302 is introduced through the top of reactor tube 202 via the inlet 104, contacts the catalyst particles present within reactor tube 202, and exits the bottom of reactor tube 202 via the outlet 106. Electrical connectors 304 from the electrical power supply 108 are shown in FIG. 3 connected to the left side of reactor tube 202. The electrical connectors 304 are configured such that they are capable of supplying electrical energy from electrical power supply 108 to an electrically conductive surface (e.g., the wall of reactor tube 202 or an external conductor electrically coupled to reactor 202) present on reactor tube 202. Finally, electrical insulators 308 are shown at the top and bottom of reactor tube 202. The electrical insulators 308 are oriented such that each reactor tube 202 is electrically isolated from other electrically conductive elements in the reactor system 100, such as piping at inlet 104 and outlet 106 as well as other reactor tubes 202.

One aspect of the present disclosure is directed to reactor system 100 comprising a plurality of reactor tubes 202 having the catalyst 302 disposed therein. The reactor tubes 202 and the catalyst 302 are heated by a method comprising providing electrical energy to at least one electrically conductive surface on each of the plurality of reactor tubes 202. It is to be understood that reactor tube 202 as referred to herein is interchangeable with embodiments described herein referencing reactor 102, when reactor 102 comprises a single reactor tube 202.

In certain aspects of the present disclosure, the reactor 102 is electrically isolated from other electrically conductive components of the reactor system 100 and the temperature of the reactor 102 and catalyst disposed therein is controlled by adjusting the current level of the electrical energy provided to the at least one electrically conductive surface on the reactor.

For example, in one aspect, the present disclosure is directed to reactor system 100 comprising a plurality of reactor tubes 202 having catalyst 302 disposed therein. The plurality of reactor tubes 202 and the catalyst are heated by a method comprising electrically isolating each of the plurality of reactor tubes 202 from other electrically conductive components of the reactor system 100; providing electrical energy to the at least one electrically conductive surface on each of the plurality of reactor tubes 202; and adjusting a current level of the electrical energy provided to the at least one electrically conductive surface to control the temperature of the reactor tube 202 and the catalyst 302 disposed therein.

A reaction system for a catalytic reaction comprises arranging a catalyst within reactor 102 and directing a fluid (i.e. a liquid or gas) through the reactor 102 where the catalytic reaction takes place. The product of the catalytic reaction is then withdrawn from the reactor 102 and collected as a final product or directed for further processing. In an embodiment, reactor 102 of the catalytic reaction may comprise a fixed or fluidized reactor. In a fixed bed reactor, the catalyst is maintained within a defined space of the reactor and the fluid flows over the catalyst and/or through the interstitial regions between the catalyst particles. In a fluidized bed reactor, the fluid is introduced into the reactor at a sufficient velocity so as to fluidize the catalyst or catalyst particles. Fluidized bed reactors may maintain the catalyst within a defined region of the reactor (e.g., between two screens) so that the catalyst is not lost during the course of the process. One example of a catalytic reaction system is a system comprising one or more reactor tubes wherein a catalyst material is disposed therein. In other embodiments, the reactor bed system may comprise a screening step to remove the catalyst from the fluid present in the reactor.

Certain catalytic reactions require the presence of external heat to promote the reaction and or efficiently produce the desired product. Previously, heat was provided to a catalytic reaction by either a direct fired heating system or an indirect fired heating system.

In a direct fired heating system, heat is supplied directed to the reactor. In an indirect fired heating system, heat is generated and transferred to an intermediate fluid. The intermediate fluid is then transported to the reactor to provide the heat. However, fired heating systems often result in uneven temperature gradients along the reactor. This non-uniform temperature along the surface of the reactor typically contribute to premature reactor failure and adversely impacts throughput, catalyst life, and yield/quality of the desired product. When the catalyst disposed within the reactor is subjected to uneven heating, the catalyst life is also greatly reduced. Additionally, fired heaters are subject to typical wear and tear which will ultimately lead to a decrease in the fired heater energy efficiency. Since most fired heaters generate heat by combustion, such as combustion of a hydrocarbon or other materials that emit greenhouse gases such as $CO_2$, this deterioration in fired heater energy efficiency contributes to an increase in greenhouse gases released and/or generated from the fired heater. In certain instances, this deterioration in efficiency may cause the efficiency to fall outside of the bounds of the design conditions.

A solution to this problem has been discovered by the method and reaction system of the present disclosure. In the present disclosure, the fired heating system is replaced with a direct electrical heating system. Furthermore, the direct electrical heating system uses the reactor 102 as the heating element by providing electrical energy to an electrically conductive surface on the reactor 102. The current provided to the reactor 102 can be modulated to control the temperature of the reactor and/or catalyst within the reactor and maintain a suitable temperature gradient. Thus, direct electrical heating of the reactor 102 allows for a finer and more accurate control of the temperature of the reactor. This results in improvements in the yield/quality of the desired product, an increase in throughput, extended catalyst life, etc.

A system comprising a plurality of reactors (e.g., reactor tubes 202) may be subjected to individual electrical heating of each reactor 202 by providing electrical energy to the electrically conductive surface of each individual reactor 202. This allows for a high degree of control of each reactor 202 and a much smaller difference in the temperature between individual reactors. A more uniform distribution of temperature along a reactor wall and consistent reactor temperatures within the reaction system further benefits the process operation by creating less stress on the reactors and thus extending the reactor and catalyst life.

The ability to finely control the temperature gradient of reactor 102 in a direct electrical heating system also allows for the possibility of dividing an individual reactor tube into two or more heating zones. This may further improve the process operations and allow for increased throughputs, yield/quality of the desired product, etc.

The problem of greenhouse gas emissions and increased pollution as a fired heater degrades can also be avoided by using an electrical heating system. Since the electrical heating system heats the reactor 102 by providing electrical energy directly to the conductive surface of the reactor, an intermediate fluid is not needed and the energy may be provided to the reactor in a manner other than combustion of a hydrocarbon or other materials that emit greenhouse gases. Instead, the present disclosure directs electrical energy to the conductive surface of the reactor 102, wherein the electrical energy may originate from any renewable energy or low-emission (i.e. low carbon-emitting source) energy source. For example, the electrical energy may be sourced from a renewable energy source selected from the group consisting of a solar energy source, wind energy source, geothermal energy source, hydroelectric energy source, or tidal energy source. In one embodiment, the electrical energy originations from a nuclear power source.

Catalyst life is impacted by the poisoning of the catalyst and physical breakdown of the catalyst. Catalyst breakdown is caused primarily by expansion and contraction of the reactor, both longitudinal and radial expansion and contraction. During a catalytic reaction wherein the reactor 102 and catalyst 302 are heated, the reactor and/or catalyst may expand or contract. For example, in a steam methane reforming process, it is typical for a 40 ft. reactor tube to expand by about 250 mm during heating, with the catalyst expanding at a significantly lower rate. As a result of this difference in expansion rates, the catalyst settles. When the reactor tube is cooled, the catalyst may be crushed during contraction of the reactor tube.

Fired heating of a reactor results in uneven temperature gradients along the reactor. The temperature gradients can be measured along the length of the reactor and/or resulting from the comparison of one side of the reactor to the opposite side. Additional hotspot can form on the reactor as a result of flame impingement or hot gas streams associated with the flame from the direct heating. Due to this uneven heating and resulting temperature gradients, the reactor undergoes uneven expansion and contraction during the heating of the reactor. This uneven expansion and contraction may be characterized as an oscillating expansion (i.e. oscillating between expansion and contraction). The resulting physical stress on the reactor from this oscillating expansion contributes significantly to the degradation of the reactor and catalyst and ultimately shortens the useable life of the reactor and/or catalyst. Premature degradation of the reactor and/or catalyst will negatively impact the throughput, yield, and/or quality of the desired product of the catalytic reaction as well as increase the maintenance and operation costs of the catalytic reaction.

In contrast, by using a direct electrical heating system of the present disclosure, it is possible to control the temperature along the reactor 102 to ensure a more even temperature gradient both longitudinal and radially. While heating of the reactor 102 by an electrical heating system may lead to expansion and contraction, the expansion and contraction is not of an oscillating nature. For example, the reactor 102 may expand once during uniform heating and contract once during uniform decrease in the electrical energy provided to heat the reactor. Thus, the usable life of the reactor 102 can be greatly improved by limiting the cycles of expansion and contraction that the reactor experiences. Likewise, the ability of a direct electrical heating system to more uniformly heat the reactor results in a more uniform heating of the catalyst present within the reactor 102. By limiting the temperature oscillation that the catalyst is subjected to, the physical integrity and usable life of the catalyst is significantly increased. While there may still be temperature variation due changes in throughput or feed composition, such variations will not significantly contribute to degradation of the reactor/catalyst as compared to traditional fired heating reactor system.

For example, in one embodiment of the present disclosure, the difference in temperature between two points on the surface of the one or more reactors is about 50° C. or less, about 40° C. or less, about 30° C. or less, about 20° C. or less, about 10° C. or less, about 5° C. or less, about 4° C. or less, about 3° C. or less, about 2° C. or less, or about 1° C. or less. In another embodiment, the difference in temperature between two points on the surface of the one or more reactors is from about 50° C. to about 0.5° C., from about 40° C. to about 0.5° C., from about 40° C. to about 1° C., from about 30° C. to about 1° C., from about 20° C. to about 1° C., from about 10° C. to about 1° C., from about 5° C. to about 1° C., from about 4° C. to about 1° C., from about 3° C. to about 1° C., or from about 2° C. to about 1° C.

In an embodiment of the present disclosure comprising a plurality of reactors, the temperature difference between the hottest reactor and the coolest reactor may be about 50° C. or less, about 40° C. or less, about 30° C. or less, about 20° C. or less, about 10° C. or less, about 5° C. or less, about 4° C. or less, about 3° C. or less, about 2° C. or less, or about 1° C. or less. For example, in some embodiment, the temperature difference between the hottest reactor and the coolest reactor may be from about 50° C. to about 0.5° C., from about 40° C. to about 0.5° C., from about 40° C. to about 1° C., from about 30° C. to about 1° C., from about 20° C. to about 1° C., from about 10° C. to about 1° C., from about 5° C. to about 1° C., from about 4° C. to about 1° C., from about 3° C. to about 1° C., or from about 2° C. to about 1° C.

In addition to improving the usable life of the reactor and catalyst and demonstrating an improved throughput, yield, and/or quality of the desired product as compared to a fired heating system, the method of the present disclosure comprising a direct electrical heating system also allows for greatly improved control of the reactor system.

As explained above, a fired heating system typically comprises combustion of a hydrocarbon or transfer of the heat energy to the reactor via an intermediate fluid (i.e., a heat transfer fluid). In a fired heating system, the amount that the reactor is heated is controlled based upon the desired temperature of the reactor fluid at the exit of the reactor. There is significant delay in adjusting the temperature of the reactor because the firing rate of the combustion must be adjusted and the intermediate fluid temperature increased such that the intermediate fluid transfers the heat to the reactor and contents thereof. In this configuration, the heat transfer from the intermediate fluid is a convective heat transfer, which is typically a slower heat transfer as compared to, for example, radiant heat transfer. In this way, there may be lag time between the control input into a fired heating system and the actual change in the temperature of the reactor fluid at the exit of the reactor.

In contrast, the electrical heating system of the present disclosure comprises providing electrical energy directly to the conductive surface on the reactor 102. For example, in one embodiment, the reactor system 100 comprises a plurality of reactor tubes 202 having catalyst 302 disposed therein and at least one electrically conductive surface on each of the plurality of reactor tubes 202, wherein electrical energy is provided to the at least one electrically conductive surface on each of the plurality of reactor tubes 202. The electrical heating system of the present disclosure controls the heat of the reactor system 100 by energy control (i.e., modulating the electrical energy provided to the at least one electrically conductive surface on each of the plurality of reactor tubes 202). Therefore, the electrical heating system of the present disclosure allows for a swift change in the reaction temperature by adjusting the electrical energy input to each reactor tube 202. This allows for more precise control of the reactor system 100, as well as the ability to more accurately maintain the temperature of each individual reactor tube 202 and reduce the maximum temperature difference between reactor tubes 202 in the reactor 102. The electrical heating system of the present disclosure also allows for reduction in the uneven distribution of temperature within an individual tube typically observed in traditional processes, i.e. the creation of hot spots due to flame impingement on the tube or other factors that leads to the maldistribution of the heat from the combustion process.

The electrical heating system of the present disclosure also allows for a correlation to be made between the inputs of the electrical energy and the catalytic reaction product. In this way, the amount of energy input to the reactor system 100 can be controlled such that no more electrical energy is introduced into the system than is required for the reaction to proceed to the desired yield or purity. In certain embodiments, it may be desirable to control the electrical energy input such that a slight excess of electrical energy is provided to the reactor system 100.

The control realized by an electrical heating system may provide exceptional improvements over a fired heating system. For example, a reactor system comprising an indirect fired heating system may require 20 minutes or longer between adjustment of the temperature profile in the heater and the desired change in the reactor system. However, reactor system 100 comprising an electrical heating system may require less than 1 minute between adjustment of the energy input to the reactor 102 and the desired change in the reactor system. This not only provides improved the safety of the reactor system 100 but allowed for a more efficient process as compared to systems comprising a fired heater.

The electrical energy provided to the at least one electrically conductive surface of the reactor 102 or plurality of reactors 102 may be from a plurality of electrical energy sources. In certain embodiments, at least a portion of the electrical energy is provided by a renewable energy source or low carbon-emitting source. For example, the energy may be provided from a nuclear power source. In other embodiments, the electrical energy is provided solely by a renewable energy source. The renewable energy source may be, for example, selected from the group consisting of a solar energy source, wind energy source, geothermal energy source, hydroelectric energy source, or tidal energy source.

The reactor 102 used in the reactor system 100 of the present disclosure may be any suitable reactor. For example, the reactor may be a fixed or fluidized reactor. In certain embodiments, the reactor of the direct electrical heating system of the present disclosure comprises a plurality of reactor tubes. For example, a plurality of fixed bed reactor tubes. Although reference is made herein to an embodiment comprising a plurality of reactor tubes, it will be understood that the reactor system and methods of the present disclosure are equally applicable to systems comprising other types of reactors.

The reactor(s) 102 are designed or selected such that each reactor has at least one electrically conductive surface for the application of electrical energy. In certain embodiments, each of the plurality of reactor(s) comprise an electrically conductive material such that at least one surface of the reactor is electrically conductive. For example, in some embodiments, the materials of construction of the reactor(s) comprise an electrically conductive material such that at least one surface of the reactor is electrically conductive. In another embodiment, the reactor(s) comprise an electrically conductive material affixed to one or more surface of the reactor.

The electrically conductive material may comprise an electrically conductive metal or alloy. For example, the metal or alloy may be selected from the group consisting of gold, silver, copper, aluminum, nickel, tin, brass, iron, platinum, palladium, molybdenum, tungsten, chromium, niobium, chromium, alloys thereof, and combinations thereof. In certain embodiments, the metal or alloy is selected from the group consisting of gold silver, copper, nickel, tin, chromium, niobium, alloys thereof, and combinations thereof. In still further embodiments, the metal is selected from the group consisting of nickel, chromium, niobium, alloys thereof, and combinations thereof. In certain embodiments, the metal is a nickel alloy wherein the alloy further comprises chromium, iron, molybdenum, and/or copper. In still further embodiments, the electrically conductive material may comprise an electrically conductive ceramic.

In one embodiment, the one or more reactor(s) 102 comprise an electrically conductive metal such that at least one surface of each reactor is electrically conductive. Each rector tube may comprise, for example, about 25 wt. % or greater, about 30 wt. % or greater, about 35 wt. % or greater, about 40 wt. % or greater, about 45 wt. % or greater, about 50 wt. % or greater, about 55 wt. % or greater, about 60 wt. % or greater, about 65 wt. % or greater, about 70 wt. % or greater, or about 75 wt. % or greater of total electrically conductive metal. In certain embodiments each rector comprises from about 25 wt. % to about 75 wt. %, from about 30 wt. % to about 70 wt. %, from about 35 wt. % to about 70 wt. %, from about 40 wt. % to about 70 wt. %, from about 45 wt. % to about 70 wt. %, from about 50 wt. % to about 70 wt. %, from about 55 wt. % to about 65 wt. %, or from about 60 wt. % to about 65 wt. % of total electrically conductive metal.

In one embodiment, each reactor 102 comprises from about 5 wt. % to about 40 wt. %, from about 10 wt. % to about 35 wt. %, from about 15 wt. % to about 30 wt. %, or from about 20 wt. % to about 30 wt. % of chromium.

In some embodiments, each reactor 102 comprises from about 5 wt. % to about 50 wt. %, from about 10 wt. % to about 45 wt. %, from about 15 wt. % to about 40 wt. %, from about 20 wt. % to about 40 wt. %, from about 25 wt. % to about 40 wt. %, or from about 30 wt. % to about 40 wt. % of nickel.

In certain embodiments, each reactor 102 comprises from about 0.5 wt. % to about 5 wt. %, from about 0.5 wt. % to about 4 wt. %, from about 0.5 wt. % to about 3 wt. %, from about 0.5 wt. % to about 2 wt. %, or from about 1 wt. % to about 2 wt. % of niobium.

In other embodiments, each reactor 102 comprises from about 0.5 wt. % to about 5 wt. %, from about 0.5 wt. % to about 4 wt. %, from about 0.5 wt. % to about 3 wt. %, from about 0.5 wt. % to about 2 wt. %, or from about 1 wt. % to about 2 wt. % of molybdenum.

In still further embodiments, each reactor 102 comprises a nickel alloy wherein the alloy further comprises chromium, iron, molybdenum, and/or copper and wherein the reactor comprises from about 0.5 wt. % to about 5 wt. %, from about 0.5 wt. % to about 4 wt. %, from about 0.5 wt. % to about 3 wt. %, from about 0.5 wt. % to about 2 wt. %, or from about 1 wt. % to about 2 wt. % of the nickel alloy.

Each of the reactors 102 of the reactor system 100 and methods of the present disclosure are insulated and/or isolated to ensure that the electrical energy provided to the at least one electrically conductive surface of the reactor does not freely flow to other parts of the reactor system. In an embodiment comprising a plurality of reactors, each of the plurality of reactors are electrically isolated from the other electrically conductive components of the reactor system. For example, each of the plurality of reactors may be electrically isolated from one another and the other electrically conductive process equipment present in the process.

The reactor(s) 102 may be electrically isolated, for example, by refractory materials. In certain embodiments, the reactor(s) 102 may be electrically isolated by a material selected from the group consisting of ceramics, nylon, polystyrene, polyvinylchloride (PVC), silicon, rubber, glass, and combinations thereof.

In one embodiment, an electrical insulator is placed at the physical connection point between the one or more reactors. In another embodiment, the reactor system 100 comprises a plurality of reactors 102 and electrical insulators are positions such that no single reactor is in contact with another reactor. In still further embodiments, the reactor system 100 comprises a plurality of reactors 102 and the plurality of reactors are electrically insulated from the remainder of the process equipment. FIG. 2, explained in further detail below, illustrates a reactor system comprising 16 reactor tubes arranged such that each reactor tube is electrically insulated and the entire reactor system is surrounded by an insulating wall material.

The material used to electrically insulate and/or isolate each of the reactors of the reactor system may be any suitable insulating/isolating material. For example, the insulating/isolating material may be selected from the group consisting of ceramics, nylon, polystyrene, polyvinylchloride (PVC), silicon, rubber, glass, and combinations thereof. In certain embodiments, the insulating/isolating material may be selected from the group consisting of refractory materials, ceramics, and glass.

It will be understood that the particular catalyst used in the reactor system 100 and methods of the present disclosure will depend on the catalytic reaction that is being conducted. An exemplary embodiment of steam methane reforming is described herein. However, the scope of the disclosure and application of the reactor system is not limited to a steam methane reforming process.

In a method comprising a steam methane reforming process, the catalyst may be a catalyst comprising nickel. The catalyst may be prepared by depositing nickel on a carrier. For example, the nickel may be deposited on an oxide substrate selected from the group consisting of $Al_2O_3$, $CeO_2$, $La_2O_3$, MgO, $SiO_2$, $ZrO_2$, calcium aluminates, and combinations thereof. In one embodiment, nickel is deposited on an alumina ceramic substrate (e.g., $Al_2O_3$).

In other embodiments methane reforming process, the catalyst may comprise Ru and/or Rh on a carrier. For example, the Ru and/or Rh may be deposited on an oxide substrate selected from the group consisting of $Al_2O_3$, $CeO_2$, $La_2O_3$, MgO, $SiO_2$, $ZrO_2$, calcium aluminates, and combinations thereof.

In one embodiment, the catalyst comprises about 10 wt. % or greater, about 15 wt. % or greater, about 20 wt. % or greater, about 25 wt. % or greater, about 30 wt. % or greater, about 35 wt. % or greater, about 40 wt. % or greater, or about 45 wt. % or greater of nickel based on the total weight of the catalyst. In another embodiment, the catalyst comprises from about 10 wt. % to about 50 wt. %, from about 15 wt. % to about 50 wt. %, from about 15 wt. % to about 40 wt. %, from about 20 wt. % to about 40 wt. %, from about 20 wt. % to about 35 wt. %, or from about 20 wt. % to about 30 wt. % of nickel based on the total weight of the catalyst. In another embodiment, the catalyst comprises from about 10 wt. % to about 50 wt. %, from about 15 wt. % to about 50 wt. %, from about 20 wt. % to about 50 wt. %, from about 25 wt. % to about 50 wt. %, or from about 30 wt. % to about 50 wt. % of nickel based on the total weight of the catalyst.

The catalyst may be in any commercially suitable shape. For example, the catalyst may be in the shape of a ring, sphere, tablet, pellet, or particle. In one embodiment, the catalyst is in the form of a ring. In other embodiments, the catalyst may be a complex shape to increase the voidage and geometric surface area (e.g., MAGCAT TEXTURED catalyst, commercially available from Magma Catalyst).

In certain embodiments, the catalyst has an average diameter of about 2 inches or less, about 1.5 inches or less, about 1.25 inches or less, about 1 inches or less, about 0.75 inches or less, about 0.5 inches or less, or about 0.25 inches or less. In one embodiment, the catalyst has an average diameter of from about 2 inches to about 0.25 inches, from about 1.75 inches to about 0.25 inches, from about 1.5 inches to about 0.25 inches, from about 1.5 inches to about 0.5 inches, from about 1.25 inches to about 0.5 inches, or from about 1 inches to about 0.5 inches.

FIG. 2 is a drawing of the top-down view of reactor 102 comprising the plurality of reactor tubes 202 having catalyst 302 disposed therein. The circles represent individual reactor tubes 202 of the reactor 102 that are insulated such that each of the individual reactor tubes 202 are electrically isolated from the other electrically conductive elements in the reactor 102. Additionally, each of the each of the individual reactor tubes 202 are electrically isolated from the other reactor tubes 202 of the reactor 102.

FIG. 3 shows a side view representation of reactor tube 202 as described above. The material to be contacted with the catalyst 302 is introduced through the top of the reactor tube 202, contacts the catalyst 302 present within the reactor tube 202, and exits the bottom of the reactor tube 202. The catalyst 302 may be maintained in the reactor tube 202 through use of one or more catalyst support plates and/or screens 310. FIG. 3 demonstrates reactor tube 202 utilizing a bottom catalyst support plate 310. The one or more catalyst support plates and/or screens 310 may be selected such that the material (e.g., a liquid or gas) contacted with the catalyst 302 may flow through the respective plates and/or screens but that the catalyst particles cannot flow out of the reactor tube 202. However, it will be well understood that in practice it may not be possible to prohibit all of the catalyst particles from flowing out of the reactor tube 202. Therefore, a support plate and/or screen 310 should be selected during the design of the reactor tube 202 to minimize loss of catalyst particles, taking into consideration the commercial considerations of the subject reaction and the properties of the catalyst 302. Electrical connectors 304 are shown in FIG. 3 connected to the left side of the reactor tube 202. As described above, these electrical connectors 304 are oriented such that they are capable of supplying electrical energy from electrical energy source 108 to the electrically conductive surface present on the reactor tube 202. Finally, electrical insulators 308 are shown at the top and bottom of the reactor tube. These electrical insulators 308 are oriented such that each reactor tube 202 is electrically isolated from the other reactor tubes 202 as well as the other electrically conductive elements in the reactor system 100.

Figure 4:
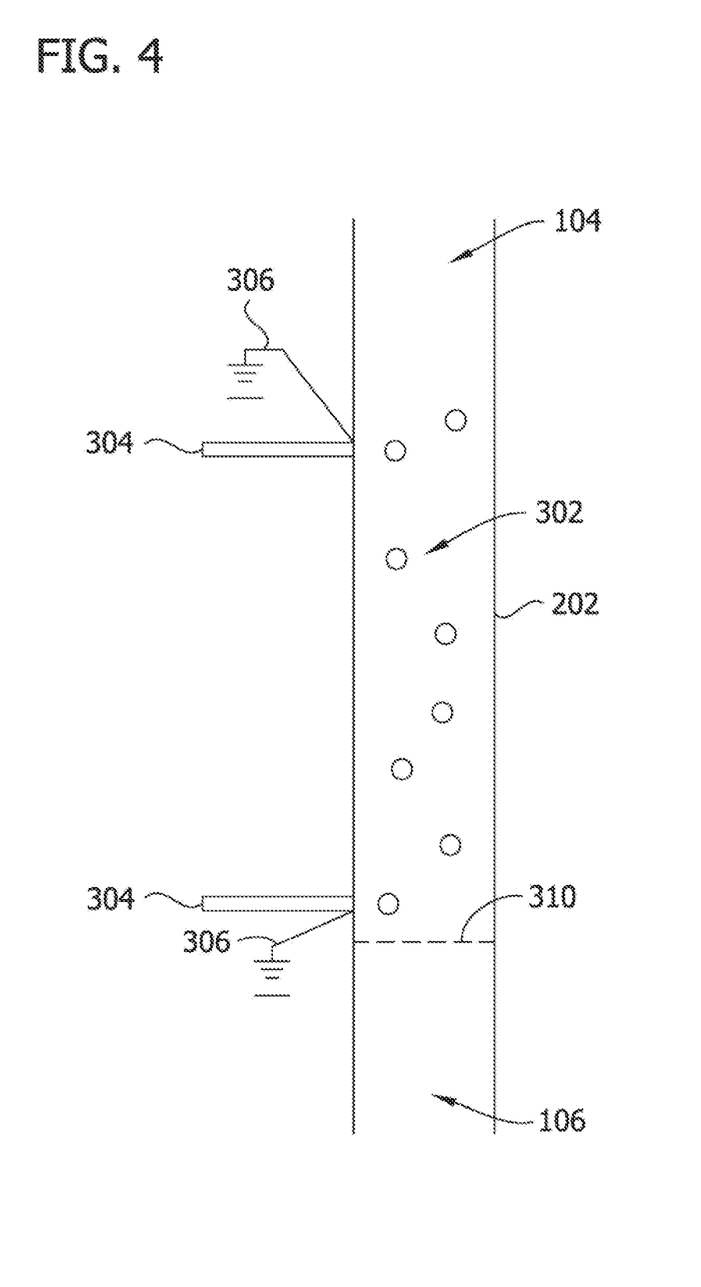
FIG. 4 provides a side view representation of an individual reactor tube of the plurality of reactor tubes present in the reactor system of FIG. 2 wherein the tube comprises electrical grounding points instead of electrical isolators.

FIG. 4 shows a side view representation of reactor tube 202 as described above. The reactor tube of FIG. 4 is similar to that of FIG. 3, except that FIG. 4 utilizes grounding points 306 in place of the electrical insulators. Electrical grounding points may be desirable as a method for electrically isolating the individual reactor tube without the need for physical insulation. In certain configurations, the exterior of the reactor tube may reach temperatures that exceed operating ranges of common insulators. Electrical isolation by a grounding point 306 allows for the isolation of the reactor tube without the requirement of using insulators specifically designed for extreme temperatures. This may result in considerable cost savings.

Figure 5:
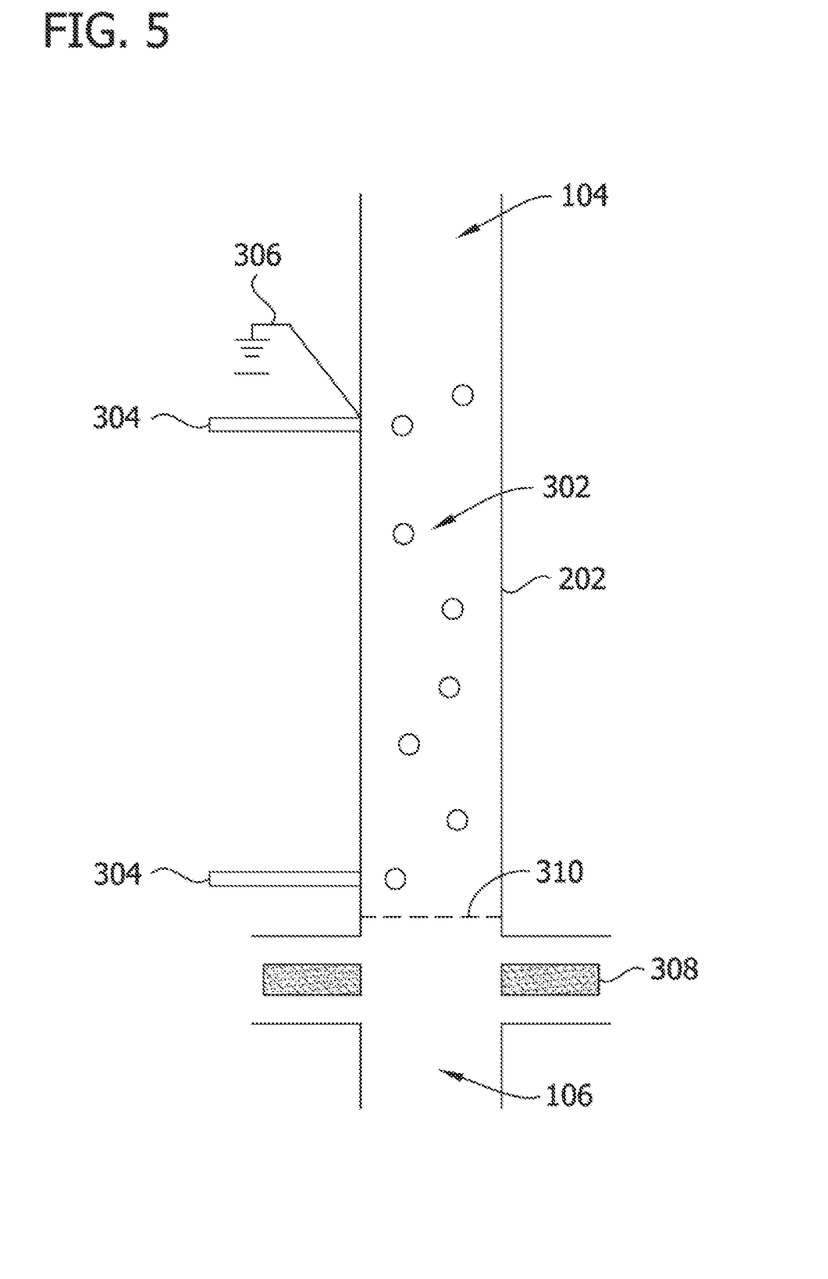
FIG. 5 provides a side view representation of an individual reactor tube of the plurality of reactor tubes present in the reactor system of FIG. 2 wherein the tube comprises an electrical grounding point in place of top electrical insulators.

FIG. 5 shows a side view representation of tube 202 as described above. The reactor tube of FIG. 5 is similar to that of FIG. 3, except that FIG. 5 utilizes a single grounding point 306 in place of the electrical insulator at the top of the reactor tube. Replacing the physical electrical insulator with a grounding point may have the advantages described above. In a reactor tube such as FIG. 5, where the material flows from the bottom to the top, the internal temperature of the reactor tube typically increases as the material flows towards the top. This is due to the material within the tube being heated as it passes through the reactor tube. By replacing only the top insulator with an electrical grounding point, the hotter end of the reactor tube is electrically isolated without the need for physical insulators specifically designed for extreme temperatures.

Figure 6:
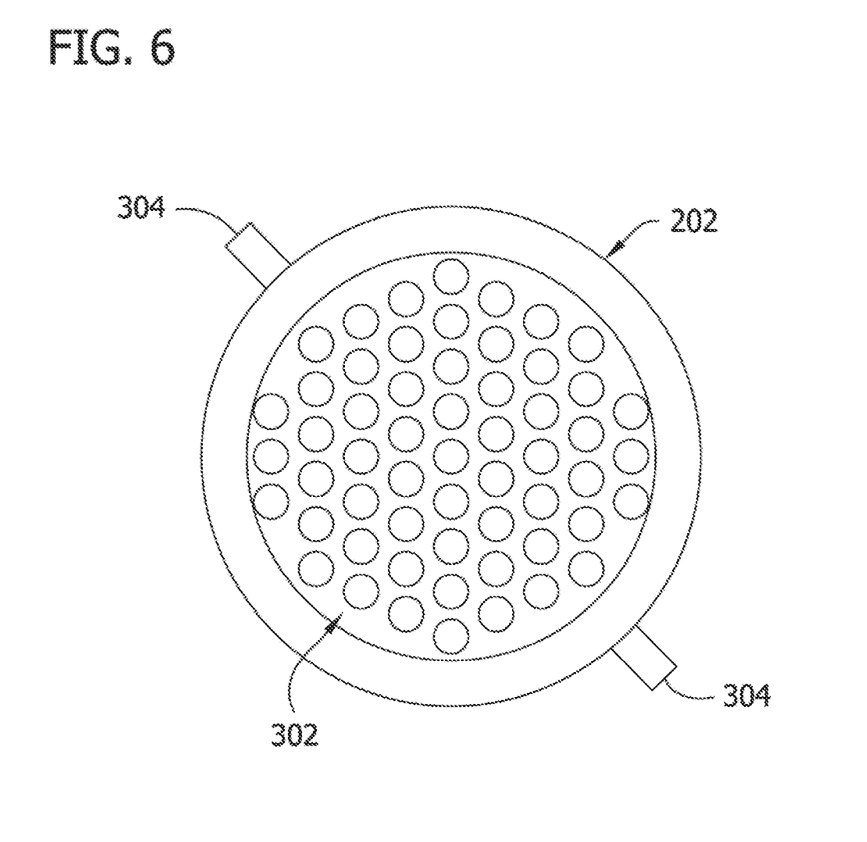
FIG. 6 provides a top-down view of an individual reactor tube of the plurality of reactor tubes present in the reactor system of FIG. 2.

FIG. 6 provides a detailed drawing of an individual reactor tube 202 of the plurality of reactor tubes 202 present in the reactor 102 of FIG. 2. The orientation of the drawing is a top-down view of the reactor tube 202. The large circle represents the wall of the reactor tube. The reactor tube wall comprises at least one electrically conductive surface such that electrically energy can be provided to the electrically conductive surface to heat the reactor tube 202 and its contents.

The particles within the large circle represent particles of catalyst 302 disposed within the reactor tube 202. Although the catalyst particles are shown as uniformly dispersed and comprising the majority of the area within the reactor tube 202, one skilled in the art would understand that the amount and orientation of the catalyst particles within the reactor tube 202 will depend upon the intended application. For example, in some reactions, the process may require a high flow rate of material. In this situation, the catalyst 302 should be packed in the reactor tube 202 at a low enough density such that the system 100 can achieve such a high flow rate and maintain the overall reaction rate desired by the process. In other reactions, it may be necessary to prolong the amount of time that the material is in physical contact with the catalyst. In that situation, it may be desirable to pack the reactor tube 202 with catalyst 302 at a higher density to increase the residence time within the reactor tube 202 and thereby increase the amount of time that the material is in physical contact with the catalyst. It will be understood that these design choices with respect to catalyst packing in the reactor tube may be made based upon the reactions conditions, catalyst composition, physical properties of the catalyst particles (i.e. particle size), and/or desired end product. That is, the catalyst may be packed in the reactor in a uniform or random orientation.

Two electrical connectors 304 are shown in FIG. 6 connected to the reactor tube wall. The electrical connectors 304 are in contact with the reactor tube wall comprising at least one electrically conductive surface. In this way, electrical energy can be supplied from electrical energy source 108 to the electrically conductive surface of each individual reactor tube 202. When electrical energy is applied to the electrically conductive surface, the reactor tube 202 heats the catalyst and reactor fluid disposed therein. The temperature of the reactor tube 202 and catalyst 302 can be finely controlled by regulating the amount of electrical energy applied to the electrical connectors 304 of each reactor tube 202.

Figure 7:
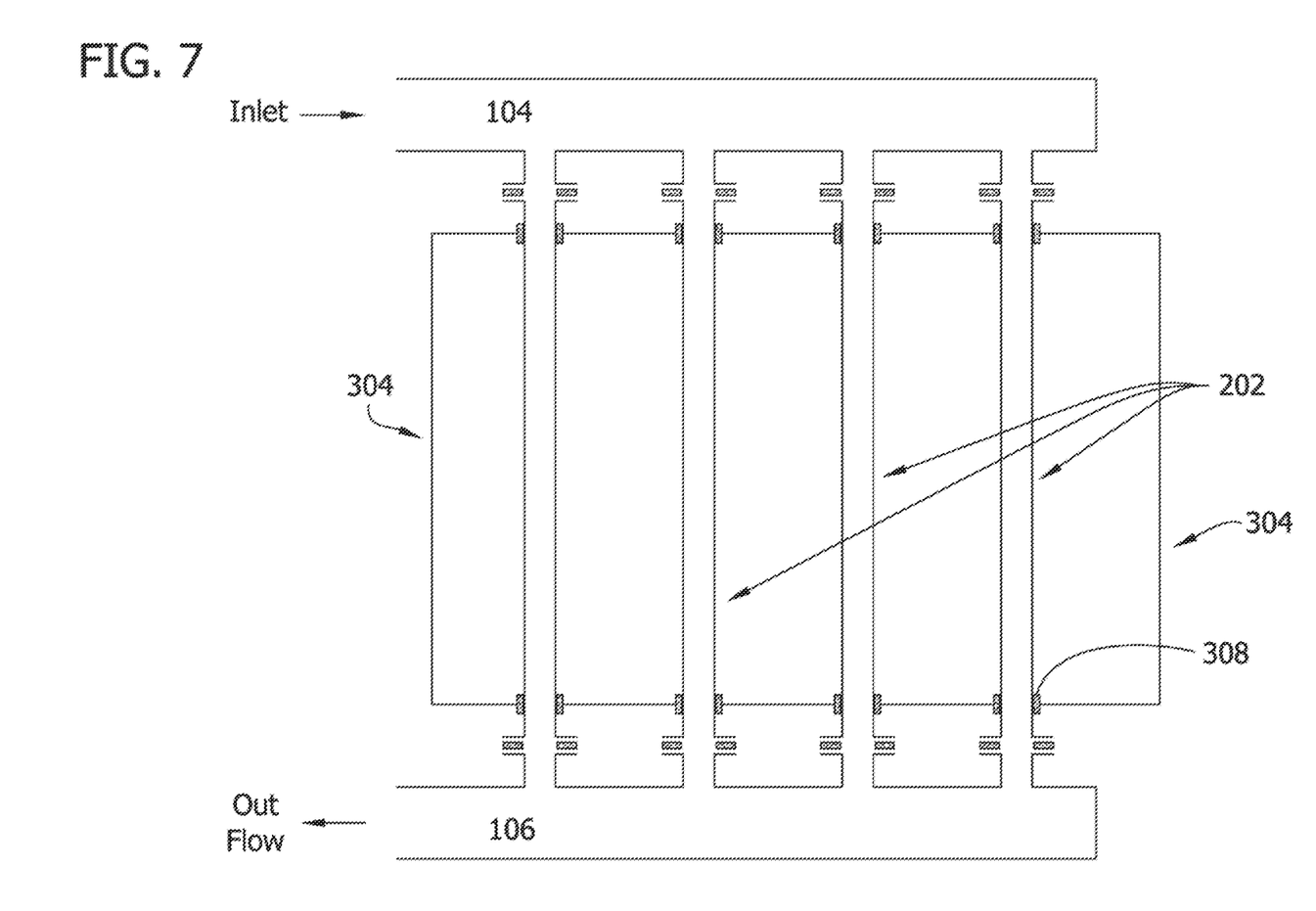
FIG. 7 provides a side view representation of the reactor system of FIG. 1 comprising a plurality of reactor tubes.

FIG. 7 shows a side view representation of reactor 102 comprising the plurality of reactor tubes 202. Each reactor tube 202 is arranged as described in FIGS. 3 and 4. In FIG. 7, an inlet flow of material at 104 to be contacted with the catalyst 302 flows into the top of each reactor tube 202, contacts the catalyst 302, and is recovered at the bottom of each reactor tube 202 at 106. Shown in FIG. 7 are the locations of the electrical connectors 304 and the electrical insulators 308. The electrical connectors 304 are interrupted by electrical insulators 308 such that each reactor tube 202 is electrically isolated from the other reactor tubes 202 and the other electrically conductive elements in the reactor system 100.

Figure 8:
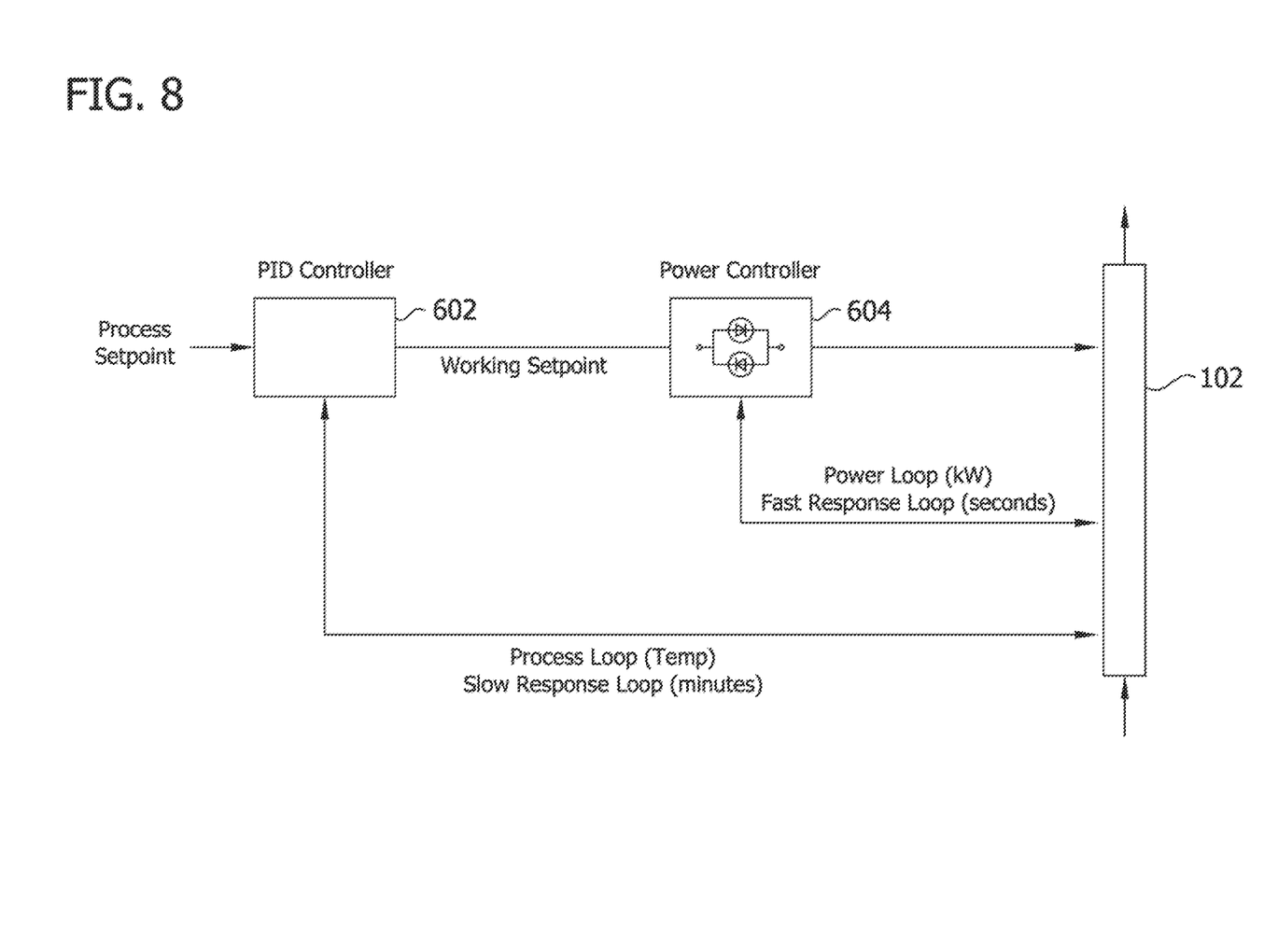
FIG. 8 illustrates a direct power control loop according to an embodiment of the reactor system.

Referring now to FIG. 8, an example of a cascade control scheme implemented by the controller 110 is shown. In this embodiment, controller 110 comprises a proportional-integral-derivative (PID) controller 602 for adjusting the electrical flow to a working setpoint and a power controller 604 responsive to the working setpoint for adjusting the current level of the power supply 108 to heat reactor 102 to achieve the desired reactor outlet temperature. PID temperature control loops tend to have a slow response loops (e.g., minutes) due to multiple factors, such as the thermal inertia and heat transfer to the reactor as well as the time response of the temperature sensor itself. In a conventional embodiment, the PID set up must be tuned in order to integrate the instabilities of the combustion, like flame instability, gas calorific value and flow variations, exhaust gas flow variations in the chamber, and the like. On the other hand, by introducing an accurate and direct power control loop (in kW, Volt or Ampere) inside the temperature control loop, the PID controller 602 of controller 110 greatly improves the stability, accuracy, and speed of the temperature control loop. In particular, the heat transfer to the reactor is much simpler with a quite constant heat transfer function (no more convection and radiation transfer modes). In addition, aspects of the present disclosure provide the opportunity to create a model of the heat transfer function and implement a predictive model-based temperature control loop, making the process control loop much faster than a typical PID control. The time response of the direct power control loop of power controller 604 is extremely accurate and fast. By eliminating the combustion instability, the gas calorific value variation, and the exhaust flow instabilities in the combustion chamber, the PID control loop of PID controller 602 is improved.

In one exemplary embodiment, the method of heating and reactor system of the present disclosure can be utilized in a steam methane reforming (SMR) process. While reference below is made to a catalytic SMR process, it will be understood that the methods and reactor system of the present disclosure is equally applicable to other catalytic reactions that comprises supplying heat to the reaction. For example, the methods and reactor systems of the present disclosure could also be applied to hydrotreating or hydrocracking operations.

A SMR process generally comprises introducing methane and steam into a catalytic reactor and heating to an elevated temperature to produce hydrogen and carbon monoxide. That is, the SMR process follows the reaction scheme set forth below.

$$CH_4 + H_2O \rightleftharpoons 3H_2 + CO$$

The catalyst of the SMR process may be a catalyst comprising nickel. For example, in one embodiment, the catalyst comprises nickel deposited on an alumina ceramic substrate such as $Al_2O_3$.

In one embodiment, the catalytic reactor of the SMR process comprises a plurality or more reactor tubes comprising electrically conductive metal(s). For example, the one or more reactor tubes may comprise nickel, chromium, niobium, and combinations thereof. In this embodiment, one or more surface of each reactor tube comprises sufficient electrically conductive metal such that at least one surface of each reactor tube is electrically conductive.

The one or more reactor tubes of the SMR process are heated by providing electrical energy to the at least one electrically conductive surface on each of the plurality of reactor tubes. The temperature of each of the plurality of reactor tubes and the catalyst disposed therein is controlled by adjusting the current level of the electrical energy provided to the at least one electrically conductive surface. Each of the plurality of reactor tubes are electrically isolated from the other electrically conductive components of the reactor system.

The SMR process may comprise heating the reactor tubes and the catalyst and reactor fluid disposed therein to a temperature of about 700° C. or greater, about 750° C. or greater, about 800° C. or greater, about 850° C. or greater, about 900° C. or greater, or about 1,000° C. or greater. In certain embodiments, the reactor tubes and the catalyst are heated to a temperature of from about 700° C. to about 1,000° C., from about 750° C. to about 900° C., from about 800° C. to about 900° C., from about 825° C. to about 900° C., from about 850° C. to about 900° C., or from about 850° C. to about 875° C. For example, in one embodiment, the SMR process comprises heating the reactor tubes and the catalyst and reactor fluid disposed therein to a temperature of about 870° C.

The SMR process may comprise maintaining a pressure of about 15 bar or greater, about 16 bar or greater, about 17 bar or greater, about 18 bar or greater, about 19 bar or greater, about 20 bar or greater, about 21 bar or greater, about 22 bar or greater, about 23 bar or greater, about 24 bar or greater, or about 25 bar or greater. For example, from about 15 bar to about 30 bar, from about 16 bar to about 30 bar, from about 17 bar to about 30 bar, from about 18 bar to about 30 bar, from about 19 bar to about 30 bar, from about 20 bar to about 30 bar, from about 20 bar to about 29 bar, from about 20 bar to about 28 bar, from about 20 bar to about 27 bar, from about 20 bar to about 26 bar, or from about 20 bar to about 25 bar.

Having described aspects of the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above system, processes, and reaction, without departing from the scope of the invention, it is intended that all matter contained in the above description and shown in the accompanying drawings shall be interpreted as illustrative and not in a limiting sense.

The invention claimed is:

1. A method of heating a reactor system, wherein the reactor system comprises a plurality of reactor tubes, and wherein each reactor tube of the plurality of reactor tubes has a catalyst disposed therein and comprises at least one electrically conductive surface, the method comprising:
   electrically isolating the reactor tubes from other electrically conductive components of the reactor system;
   providing electrical energy to the at least one electrically conductive surface of each of the plurality of reactor tubes; and
   individually adjusting a current level of the electrical energy provided to the at least one electrically conductive surface of each reactor tube of the plurality of reactor tubes to individually control the temperature of each reactor tube of the plurality of reactor tubes and the catalyst disposed therein;
   wherein the difference in temperature between two points on the surface of each of the plurality of reactor tubes is about 50° C. or less; and
   wherein fluid enters each reactor tube of the plurality of reactor tubes via an associated inflow pipe arrangement and exits each reactor tube of the plurality of reactor tubes via an associated outflow pipe arrangement, and wherein electrically isolating the plurality of reactor tubes from the other electrically conductive components of the reactor system comprises placing an insulative gasket between each reactor tube of the plurality of reactor tubes and the associated inflow pipe arrangement and placing an insulative gasket between each reactor tube of the plurality of reactor tubes and the associated outflow pipe.

2. The method of claim 1, wherein each of the reactor tubes comprises an electrically conductive material such that at least one surface of each of the reactor tubes is electrically conductive.

3. The method of claim 1, wherein each of the reactor tubes comprises an electrically conductive material affixed thereto, and wherein the electrically conductive material affixed thereto forms an electrically conductive surface of each of the reactor tubes.

4. The method of claim 2, wherein the electrically conductive material comprises a metal or alloy selected from the group consisting of gold, silver, copper, aluminum, nickel, tin, brass, iron, platinum, palladium, molybdenum, tungsten, chromium, niobium, chromium, alloys thereof, and combinations thereof.

5. The method of claim 4, wherein the metal or alloy is selected from the group consisting of nickel, chromium, niobium, alloys thereof, and combinations thereof.

6. The method of claim 1, wherein the insulative gasket comprises material selected from the group consisting of ceramics, nylon, polystyrene, polyvinylchloride (PVC), silicon, rubber, glass, and combinations thereof.

7. The method of claim 1, wherein each reactor tube of the plurality of reactor tubes is further electrically isolated from the other electrically conductive components of the reactor system by an isolating material selected from the group consisting of refractory materials, ceramics, glass, and combinations thereof.

8. The method of claim 1, wherein the catalyst comprises nickel deposited on an oxide substrate.

9. The method of claim 1, wherein the catalyst comprises nickel deposited on an alumina ceramic substrate.

10. The method of claim 1, wherein the catalyst comprises from about 10 wt. % to about 50 wt. % of nickel based on the total weight of the catalyst.

11. The method of claim 1, wherein the catalyst has an average diameter of about 2 inches or less.

12. The method of claim 1, wherein the electrical energy is supplied by a renewable energy source.

13. The method of claim 12, wherein the renewable energy source is selected from the group consisting of a solar energy source, wind energy source, geothermal energy source, hydroelectric energy source, or tidal energy source.

14. A steam methane reforming reaction comprising the method of claim 1.

15. The method of claim 1, comprising:
executing, by a proportional-integral-derivative (PID) controller, a cascade control scheme; and
adjusting a working setpoint of the PID controller in accordance with the cascade control scheme, wherein a power controller coupled to an electrical energy source is responsive to the working setpoint for adjusting a current level of the electrical energy source to heat each reactor tube of the plurality of reactor tubes to a desired reactor outlet temperature.

16. A method of heating a reactor system, wherein the reactor system comprises a plurality of reactor tubes, and wherein each reactor tube of the plurality of reactor tubes has a catalyst disposed therein and comprises at least one electrically conductive surface, the method comprising:
electrically isolating the reactor tubes from other electrically conductive components of the reactor system;
providing electrical energy to the at least one electrically conductive surface of each of the plurality of reactor tubes; and
individually adjusting a current level of the electrical energy provided to the at least one electrically conductive surface of each reactor tube of the plurality of reactor tubes to individually control the temperature of each reactor tube of the plurality of reactor tubes and the catalyst disposed therein;
wherein the difference in temperature between two points on the surface of each of the plurality of reactor tubes is about 50° C. or less; and
wherein at least one reactor tube of the plurality of reactor tubes differs in temperature from the temperature of another reactor tube of the plurality of reactor tubes and wherein the temperature difference between a hottest reactor tube of the plurality of reactor tubes and a coolest reactor tube of the plurality of reactor tubes is about 50° C. or less.

17. The method of claim 16, wherein each of the reactor tubes comprises an electrically conductive material such that at least one surface of each of the reactor tubes is electrically conductive.

18. The method of claim 17, wherein the electrically conductive material comprises a metal selected from the group consisting of gold, silver, copper, aluminum, nickel, tin, brass, iron, platinum, palladium, molybdenum, tungsten, chromium, niobium, chromium, alloys thereof, and combinations thereof.

19. The method of claim 18, wherein the metal is selected from the group consisting of nickel, chromium, niobium, alloys thereof, and combinations thereof.

20. The method of claim 16, wherein each of the reactor tubes comprises an electrically conductive material affixed thereto, and wherein the electrically conductive material affixed thereto forms an electrically conductive surface of each of the reactor tubes.

21. The method of claim 16, wherein the electrical energy is supplied by a renewable energy source.

22. The method of claim 21, wherein the renewable energy source is selected from the group consisting of a solar energy source, wind energy source, geothermal energy source, hydroelectric energy source, or tidal energy source.

23. A method of heating a reactor system, wherein the reactor system comprises a plurality of reactor tubes, and wherein each reactor tube of the plurality of reactor tubes has a catalyst disposed therein and comprises at least one electrically conductive surface, the method comprising:
electrically isolating the reactor tubes from other electrically conductive components of the reactor system;
providing electrical energy to the at least one electrically conductive surface of each of the plurality of reactor tubes; and
individually adjusting a current level of the electrical energy provided to the at least one electrically conductive surface of each reactor tube of the plurality of reactor tubes to individually control the temperature of each reactor tube of the plurality of reactor tubes and the catalyst disposed therein;
wherein the difference in temperature between two points on the surface of each of the plurality of reactor tubes is about 50° C. or less; and
wherein fluid enters the plurality of reactor tubes via an inflow pipe arrangement and exits the reactor tubes via an outflow pipe arrangement, and wherein electrically isolating the reactor tubes from the other electrically conductive components of the reactor system comprises placing an insulative gasket between the inflow pipe arrangement and the other electrically conductive components of the reactor system and placing an insulative gasket between the outflow pipe arrangement and the other electrically conductive components of the reactor system.

24. The method of claim 23, wherein each of the reactor tubes comprises an electrically conductive material such that at least one surface of each of the reactor tubes is electrically conductive.

25. The method of claim 23, wherein each of the reactor tubes comprises an electrically conductive material affixed thereto, and wherein the electrically conductive material affixed thereto forms an electrically conductive surface of each of the reactor tubes.

26. The method of claim 25, wherein the electrically conductive material comprises a metal or alloy selected from the group consisting of gold, silver, copper, aluminum, nickel, tin, brass, iron, platinum, palladium, molybdenum, tungsten, chromium, niobium, chromium, alloys thereof, and combinations thereof.

* * * * *